US012359937B2

United States Patent
Rackow

(10) Patent No.: US 12,359,937 B2
(45) Date of Patent: Jul. 15, 2025

(54) DRIVING PROFILE ESTIMATION IN AN ENVIRONMENT MODEL

(71) Applicant: Conti Temic microelectronic GmbH, Nuremberg (DE)

(72) Inventor: Kristian Rackow, Grasbrunn (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 389 days.

(21) Appl. No.: 17/655,144

(22) Filed: Mar. 16, 2022

(65) Prior Publication Data

US 2022/0299339 A1 Sep. 22, 2022

(30) Foreign Application Priority Data

Mar. 16, 2021 (DE) ...................... 10 2021 202 571.4
Apr. 16, 2021 (DE) ...................... 10 2021 203 809.3

(51) Int. Cl.
*G01C 21/00* (2006.01)
*B60W 60/00* (2020.01)

(52) U.S. Cl.
CPC ....... *G01C 21/3807* (2020.08); *B60W 60/001* (2020.02); *G01C 21/3844* (2020.08); *B60W 2420/403* (2013.01); *B60W 2420/408* (2024.01)

(58) Field of Classification Search
CPC ............ G01C 21/3807; G01C 21/3844; G01C 21/3815; B60W 60/001; B60W 2420/403;
(Continued)

(56) References Cited

U.S. PATENT DOCUMENTS

| 2006/0293856 A1* | 12/2006 | Foessel | B60W 30/09 |
| | | | 701/301 |
| 2007/0156286 A1* | 7/2007 | Yamauchi | G05D 1/027 |
| | | | 700/245 |

(Continued)

FOREIGN PATENT DOCUMENTS

| CN | 102359784 A | 2/2012 |
| CN | 104554258 A | 4/2015 |

(Continued)

OTHER PUBLICATIONS

German Office Action dated Aug. 11, 2021 for the counterpart German Patent Application No. 10 2021 203 809.3.
(Continued)

*Primary Examiner* — Vivek D Koppikar
*Assistant Examiner* — Dominick Mulder

(57) ABSTRACT

A method for creating a road model for planning a trajectory of an ego vehicle, includes capturing a vehicle environment with at least one environment capturing sensor. Objects are detected in the vehicle environment. The method includes producing a grid map with a plurality of grid cells and entering the detections into the grid map wherein the detections are enlarged prior to being entered. The method also includes determining at least one path through the grid map which consists only of vacant grid cells. The at least one path is gradually scanned, wherein detections are determined orthogonally to a scanning direction of the path on both sides. The method further includes assigning the detections along the at least one path to road boundaries and creating the road model based on the previously determined information.

6 Claims, 4 Drawing Sheets

(58) Field of Classification Search
CPC ........... B60W 2420/408; B60W 40/02; B60W 50/00; B60W 2050/0028
USPC .......................................................... 701/26
See application file for complete search history.

(56) References Cited

U.S. PATENT DOCUMENTS

| | | | |
|---|---|---|---|
| 2008/0306680 A1* | 12/2008 | Marty .................. | G08G 5/0034 701/533 |
| 2010/0076640 A1 | 3/2010 | Maekawa et al. | |
| 2013/0079990 A1 | 3/2013 | Fritsch et al. | |
| 2013/0194086 A1* | 8/2013 | Igarashi ................. | G06V 20/58 340/435 |
| 2015/0353083 A1* | 12/2015 | Hasberg ............... | G05D 1/0274 701/1 |
| 2016/0082955 A1* | 3/2016 | Nguyen Van .......... | G08G 1/166 701/41 |
| 2018/0162392 A1* | 6/2018 | Takaki .................. | B60W 10/18 |
| 2018/0201260 A1* | 7/2018 | Ichikawa ................ | G01S 17/58 |
| 2018/0217600 A1 | 8/2018 | Shashua et al. | |
| 2019/0310653 A1* | 10/2019 | Lee ....................... | G05D 1/0246 |
| 2019/0369626 A1 | 12/2019 | Lui et al. | |
| 2020/0005647 A1* | 1/2020 | Tsurumi ................ | G01C 21/34 |
| 2020/0191907 A1* | 6/2020 | Jo ......................... | G01S 13/878 |
| 2020/0225622 A1* | 7/2020 | Buerkle .................. | G01S 15/04 |
| 2020/0349841 A1* | 11/2020 | Zerod .................... | B60W 50/14 |
| 2021/0116930 A1* | 4/2021 | Ariki ..................... | G05B 13/0265 |
| 2021/0179141 A1* | 6/2021 | Sadek .................... | B60W 50/14 |
| 2021/0278850 A1* | 9/2021 | Moore ................... | G01S 17/89 |
| 2022/0022716 A1* | 1/2022 | Wu ....................... | A47L 11/4011 |
| 2022/0163335 A1* | 5/2022 | Beaurepaire ........ | G01C 21/3492 |
| 2022/0343241 A1* | 10/2022 | Jha ........................ | G08G 1/166 |
| 2022/0383749 A1* | 12/2022 | Ishikawa ............... | B60W 40/04 |
| 2023/0095384 A1* | 3/2023 | Sharma Banjade ........................ G08G 1/096725 701/301 |

FOREIGN PATENT DOCUMENTS

| | | |
|---|---|---|
| CN | 104933218 A | 9/2015 |
| CN | 105246754 A | 1/2016 |
| CN | 107480638 A | 12/2017 |
| CN | 108646765 A | 10/2018 |
| CN | 111758017 A | 10/2020 |
| DE | 102016200642 A1 | 7/2017 |
| DE | 102017208509 A1 | 11/2018 |
| DE | 102018123896 A1 | 1/2020 |
| DE | 102019213927 A1 | 3/2021 |
| EP | 3748456 A1 | 12/2020 |
| JP | 2010073080 A | 4/2010 |
| JP | 2010160777 A | 7/2010 |
| JP | 2011145743 A | 7/2011 |
| JP | 2013073620 A | 4/2013 |
| JP | 2014006588 A | 1/2014 |
| JP | 2018138403 A | 9/2018 |
| JP | 2020115349 A | 7/2020 |
| JP | 2021519720 A | 8/2021 |
| WO | 2020002100 A1 | 1/2020 |

OTHER PUBLICATIONS

Office Action drafted Feb. 28, 2023, for the counterpart Japanese Application No. 2021-203046 and Global Dossier Translation.
Chinese Office Action dated Mar. 7, 2025 corresponding to Chinese Patent Application No. 202210177474.8.

* cited by examiner

DRIVING PROFILE ESTIMATION IN AN ENVIRONMENT MODEL

CROSS-REFERENCE TO RELATED APPLICATIONS

This application claims priority to German application Nos. 10 2021 202 571.4, filed Mar. 16, 2021, and 10 2021 203 809.3, filed Apr. 16, 2021, each of which is hereby incorporated by reference.

BACKGROUND

The use of driver assistance systems for supporting a driver in his driving tasks is widespread.

To this end, radar, lidar, ultrasonic and camera sensors are used to capture the environment of a vehicle. The captured data are preferably combined in an environment model. The environment model can depict the vehicle surroundings such that they are segmented into spatial subregions; such a subregion is also referred to as a cell of an (environment) grid. In an environment model, the individual grid cell is preferably assigned one or more attributes such as vacant, occupied, passable, static obstacle, etc. or the status of the cell can be described by reference to one or more probabilities for, e.g., vacant or occupied, passable and not passable.

An important part of the environment analysis is recognizing the road profile. In order to recognize the road and its boundary, current radar systems divide their sensor data into static and dynamic detections.

The static detections are either combined into larger clusters (accumulations) and tracked (monitored) or they are entered into a grid (environment model having grid cells, an occupancy grid). In order to detect the road, the left and right sides of the road or the left and right road boundaries have to be identified in the data. To this end, an attempt is made to identify particularly prominent points and to classify these with complex algorithms as points belonging to the left road boundary and points belonging to the right road boundary.

These points are preferably transferred with a Kalman filter (or any other approximation method) into a model for describing the road profile, e.g., on the basis of a Euler spiral model.

The models used are distinguished between separate edges of the road (the left and right edges of the road can have completely different profiles) or coupled edges of the road (the left and right edges behave in the same way and merely differ in terms of the distance from each other).

The aim is to improve the methods described above (and common modifications thereof), in particular:
  The separation of the left and right edge of the road is complicated, partially inaccurate and above all prone to errors;
  Although the "prominent points" are indeed prominent, they often do not represent the boundary of the road/the navigable region, but are merely particularly highly reflective static objects (e.g., guardrail, house walls, garden fences, etc.). However, the actual roadway boundary is frequently much closer than the prominent extracted points;
  Intersections, junctions, exits, widenings, etc. are not recognized and lead to erroneous road boundaries;
  The mathematical models used to describe the edge of the road are too restrictive and can only be well utilized on highways;
  Or the models used are too flexible and statements can frequently only be made about short parts or edges of the road which are only on one side;
  Current approaches are limited to simple surroundings such as highways and only work in an unsatisfactory manner in urban surroundings.

It is therefore desirable to create a road model from sensor data which supplies sufficient information in order to be able to map all of the associated (driving) functions in an improved manner.

In particular, an improvement of the Emergency Brake Assist (EBA) with its various areas of application, in particular in urban regions, is striven for. However, this does not constitute a restriction for the area of application of the invention presented below, which can be used for all conceivable driving functions and maneuvers.

SUMMARY

A basic reasoning is that a road must offer enough space to allow a car to drive on it. This means that the resulting driving path (actual lane of a vehicle) requires a minimum width (e.g., 2.5 m) so that a car can move thereon.

For this purpose, a method for creating a road model for planning a trajectory of an ego vehicle, having the following steps is proposed:
  capturing a vehicle environment by means of at least one environment capturing sensor;
  detecting objects in the vehicle environment;
  producing a grid map with a plurality of grid cells;
  entering the detections into the grid map, wherein the detections are enlarged prior to being entered;
  determining at least one path through the grid map, which consists only of vacant grid cells;
  gradually scanning the at least one path, wherein detections are determined orthogonally to a scanning direction of the path on both sides;
  assigning the detections along the at least one path to road boundaries;
  creating the road model based on the previously determined information.

The method described above may use at least one radar sensor, but can very easily be extended to further sensor types. It is easily possible to integrate camera detections or even map data into the grid in the same way or even to use these for extended scoring/weightings. Therefore, a sensor data fusion is very easily but effectively carried out.

In order to create the grid or course grid, the (radar) detections are not entered directly into a grid (occupancy grid) as is usually the case. Instead, all of the detections are enlarged. In addition to radar detections, other data can also be entered into the grid. This results in the advantage that the distance to be maintained can be modeled differently in the grid for all of the different sensor data. Thus, a left curbstone can, e.g., be enlarged by 1 m to the right (in order to obtain the corresponding driving path width) but by 5 m to the left to ensure, without fail, that there is no driving path free behind the curbstone.

Due to the use of the course grid, it is then possible to search for simple paths in particular through the grid. During this, at least one path consisting only of vacant cells is sought. This at least one path is wide enough (due to the special way it is entered into the grid) for a car to fit through.

The search for a path is situation-dependent, efficient and in particular allows the preferred path (and, consequently, ultimately the road profile) to be weighted individually and precisely. As an extension, paths that have individual occupied cells, which can be regarded as incorrect detections or as being passable above or below, can also be considered.

Furthermore, the step of scanning the path is advantageous in the method. This means that scanning is carried out orthogonally to the profile of the path to the left and right at predefinable regular intervals (for example, every 2 m) until a detection is encountered in the sensor data. This point then represents in particular a part of the edge of the road. If no detection is found, an estimation can be carried out, e.g., on the basis of other detections, to which estimation a very low probability of existence is assigned. On the one hand, this method makes it possible to differentiate between detections of the left or right edge of the road extremely reliably. On the other hand, it also makes it possible to select better prominent points, since in particular the points thus found do not necessarily only correspond to "good" detections (in the sense of strong reflectance/radar measurement) but stand out because they separate the passable region from the non-passable region.

As an alternative to orthogonal scanning, it is also possible to scan in another defined direction, e.g., the y direction.

The individual points/detections can be weighted, based on their intensity, the size of the associated cluster, a sensor classification and can, in part, be shifted in position. Thus, a point belonging to a curbstone and captured by a camera sensor can, e.g., be given a very high weighting and a point belonging to a very weak radar cluster (detection) can be given a very low weighting.

Consequently, the points found previously can be used in order to supply an edge of the road. For this purpose, an approximation method (e.g., weighted linear least squares) or a tracking method (e.g., Kalman filter) can be used to estimate the road profile with the aid of the points. The strength or size of the detection in the grid can, in addition, be used as a weighting.

In one configuration, in a further step, the road model is provided to at least one driving function.

Furthermore, the grid map may have a grid resolution of at least 0.5 m per grid cell.

In a further advantageous configuration, it is provided that a minimum width is predefined for the at least one determined path.

The detections may be enlarged by an amount which corresponds to at least half of the difference between the minimum width of the path and the resolution of the grid. This enlargement is advantageous since the direct conclusion can consequently be drawn for empty cells that a car fits into the vacant region. This is explained in greater detail below by means of an example. For example, the grid resolution is, e.g., 0.5 m (G) (i.e., a grid cell represents a region having this dimension in a vehicle environment) and the assumed/sought-after driving path width is, e.g., 2.5 m (B_F). All of the detections of objects in the vehicle surroundings are now enlarged by (B_F−G)/2 (example: (2.5 m−0.5 m)/2=1 m). The enlargement takes place in a preferred spatial direction or alternatively in all of the spatial directions. If an object is now located in this numerical example at y=−1 m, it occupies cells (enlarged by 1 m) up to 0 m (−1 m+1 m=0 m) or up to −2 m. Another object at y=+1.5 occupies cells of 0.5 m (1.5 m−1 m=0.5) or 2.5 m. It is therefore guaranteed that one cell (from 0 m to 0.5 m) remains vacant with this object distance of 2.5 m.

In a further configuration, the enlargement of the detections is carried out in a specific spatial direction or in all of the spatial directions.

Furthermore, the enlargement of the detection may be different for each spatial direction. For example, the enlargement on the side facing away from the vehicle can be smaller than on the side facing the vehicle or in areas directly adjacent to a possible driving trajectory of the vehicle.

In general, when the detections are enlarged prior to being entered, it is advantageous that the minimum width, which is assumed as a condition, is itself already entered into the grid (occupancy grid). Consequently, a vacant cell always signals that a vehicle of the assumed width fits through there. In contrast to simply entering the objects, it is no longer necessary to check whether the neighboring cells are vacant and whether there is enough space.

Although this creates a slightly greater computational cost (due to the enlargement of the objects) when the objects are entered into the grid, there is no need to carry out a check whether there is sufficient width, which would have to be carried out individually for each cell, and when searching for a path. As an alternative to widening them when they are entered, the cells occupied in the grid can also be widened after they have been entered into the grid.

In a further embodiment, multiple, but at least two, hypothetical paths are precalculated, wherein these paths are weighted based on definable features. For each of these hypotheses, it can be advantageously indicated exactly which cells have to accordingly be checked to establish whether they are occupied. I.e., the calculation whether a path (the corresponding hypothesis) through the grid (and consequently, a road profile through the sensor detections) is possible is reduced to reading memory accesses in the grid.

Common algorithms for searching for paths allow many possible paths and the computational cost is very large, despite considerable optimization. By limiting the outlay to precalculated hypotheses, the complexity is significantly reduced in an advantageous way and the search is limited to relevant paths. This greatly reduces the computational cost.

The hypotheses do not have to correspond to a specific class of functions (as is the case in state-of-the-art methods), but can be mixed from different function classes and also consist of free paths. Thus, e.g., polynomials having circular arcs, splines, etc. can be combined and can all be incorporated jointly into the total amount of hypotheses.

The functions and classes used can be selected depending on the ODD (operational domain, e.g., highway, country road, city) or can be limited to certain functions and classes in order to reduce the computational cost. Sudden 90° curves are not possible on the highway, but by contrast are possible in the city. A score that roughly corresponds to its theoretical probability (e.g., straight road profiles are more likely than sharp curves) is established for each hypothesis. If it is checked whether a path leads through the grid, it is in addition checked how far this path extends or when it encounters an obstacle. This length produces a further weight which, together with the base score of the hypothesis (=the tested path), produces a total probability. For time stabilization, the path previously traversed is additionally entered into a separate data field in the grid (neighboring cells can additionally be marked accordingly as well). Paths that pass through this cell are given additional scores. This will better evaluate paths that are similar to the previous path during the current search. As a result, a temporal stabilization is achieved. The path thus created can be used directly as a "driving corridor" or as a potential trajectory of the vehicle.

BRIEF DESCRIPTION OF THE DRAWINGS

Further advantageous configurations and embodiments are the subject-matter of the drawings, wherein.

DETAILED DESCRIPTION

Figure 1:
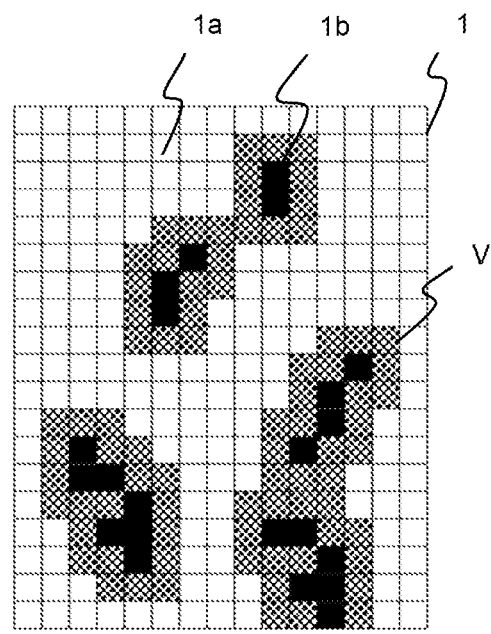
FIG. 1 shows a schematic view of a grid according to an embodiment of the invention.

FIG. 1 shows a schematic view of a grid 1 according to an exemplary embodiment. This grid 1 or the grid map 1 consists of vacant 1a and occupied grid cells 1b. The detections, which are depicted as occupied grid cells 1b, are enlarged when they are entered into the grid map. Accordingly, some grid cells are not directly occupied, but are captured by the enlargement V. By entering the enlargement V of the detections, it can be ensured that the vacant grid cells 1a represent a wide enough region so that a vehicle can easily pass through the detections.

Figure 2:
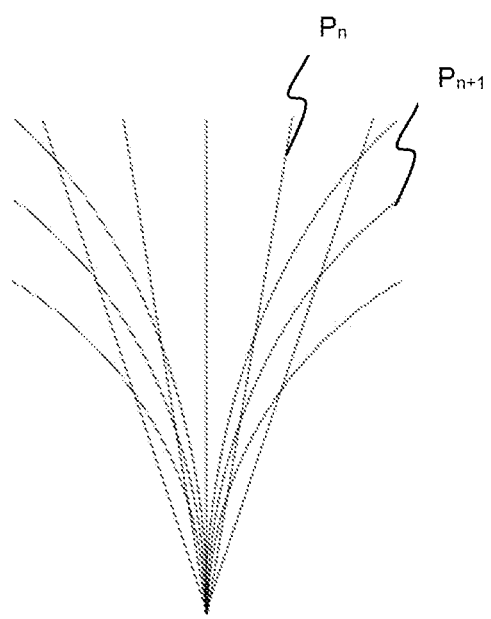
FIG. 2 shows a schematic representation of multiple hypothetical paths.

FIG. 2 shows a schematic representation of multiple hypothetical paths $P_n$. The hypothetical paths n $P_n$-$P_{n+1}$ depicted here can be calculated in advance in the system in order to select the path $P_n$, which only runs through vacant grid cells 1a through the grid map 1, at a later time.

Figure 3:
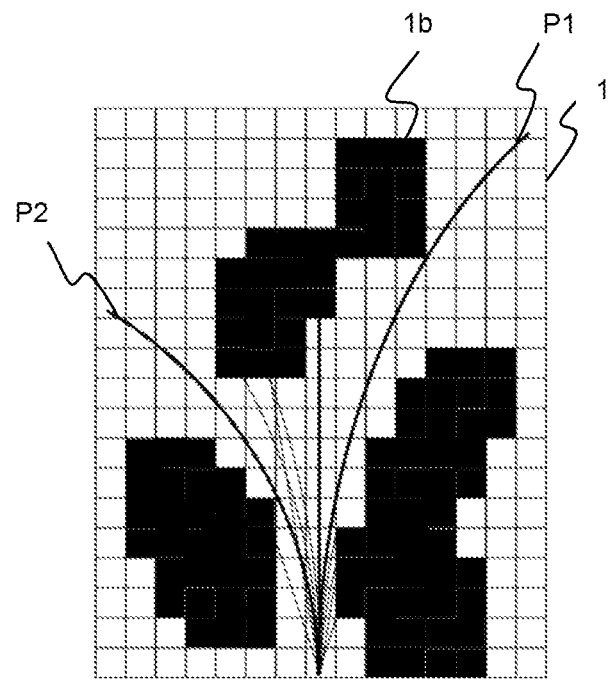
FIG. 3 shows a further schematic representation of a grid according to an embodiment of the invention having multiple paths.

FIG. 3 shows a further schematic representation of a grid 1 according to an embodiment of the invention having multiple paths. In this representation, the enlargements V have been used to expand the occupied grid cells 1b. The precalculated hypothetical paths $P_n$-$P_{n+1}$ shown in FIG. 2 have then been entered into the grid map 1. The paths P1 and P2, which are not blocked by occupied grid cells 1b (with the calculated enlargement V), have then been selected. These two paths P1 and P2 run through the grid map 1 only through vacant grid cells 1a. The remaining paths $P_n$ are blocked by the occupied grid cells 1b.

Figure 4:
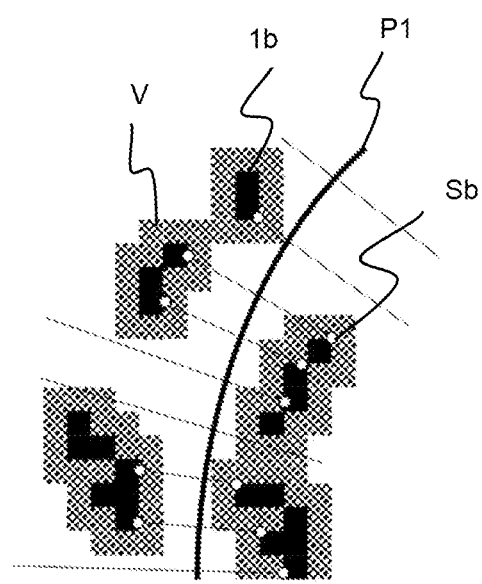
FIG. 4 shows a further schematic representation of a grid according to an embodiment of the invention having road boundaries.

FIG. 4 shows a further schematic representation of a grid 1 according to an embodiment of the invention having road boundaries Sb. In this representation, the path P1 has been selected. Along this path P1, the path is then scanned at regular intervals in the orthogonal direction to the departure direction of the path P1. The scanning determines points which can be assigned to detections along the lane. These points are then categorized as a road boundary Sb.

Figure 5:
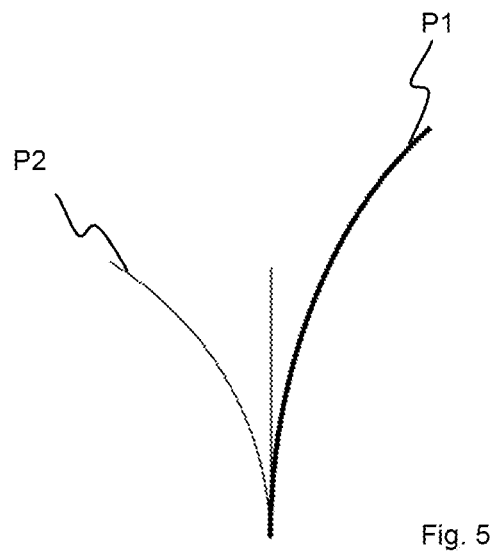
FIG. 5 shows a schematic representation of a selection of hypothetical paths.

FIG. 5 shows a schematic representation of a selection of hypothetical paths. This representation substantially corresponds to the selection of paths from FIG. 3. Paths P1 and P2 are selected on the basis of the profile through the grid map 1.

Figure 6:
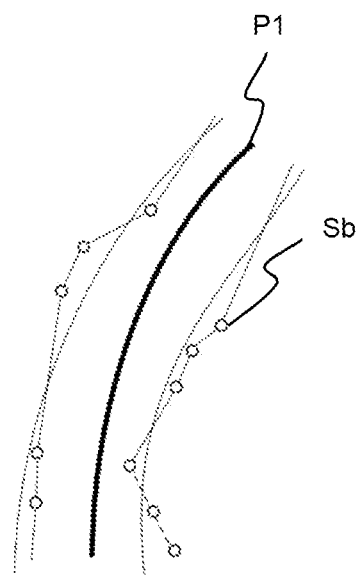
FIG. 6 shows a schematic representation of a road model according to an embodiment of the invention.

FIG. 6 shows a schematic representation of a road model according to an embodiment of the invention. In this road model, the path P1 is selected which only runs through vacant grid cells 1a (not shown here). Furthermore, the points of the road boundaries Sb are shown, which substantially describe a profile of edges of the road. This road model can then be provided to a driver assistance system, for example.

Figure 7:
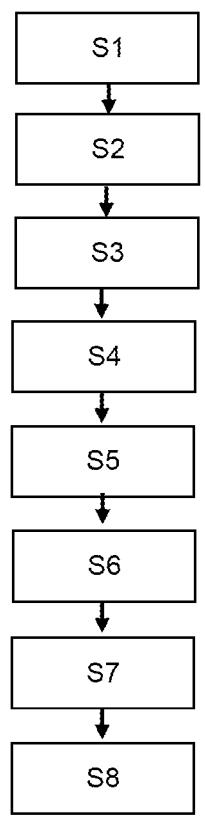
FIG. 7 shows a schematic flowchart of the method according to an embodiment of the invention.

FIG. 7 shows a schematic flowchart of the method according to an embodiment of the invention. In step S1, a vehicle environment is captured by means of at least one environment capturing sensor. In step S2, objects in the vehicle environment are detected. The objects are determined, for example, from a camera image or based on radar detections. In step S3, a grid map 1 having a plurality of grid cells 1a, 1b is produced. In step S4, the detections are entered into the grid map 1, wherein the detections are enlarged prior to being entered. Consequently, the detections themselves are entered as occupied grid cells 1b and, additionally, an amount which can be established as an enlargement V is entered into the grid map 1. In a further step S5, at least one path through the grid map 1 is determined, which consists only of vacant grid cells 1a. Furthermore, in step S6, the at least one path is gradually scanned, wherein detections are determined orthogonally to a scanning direction of the path on both sides. In a step S7, the detections along the at least one path are assigned to road boundaries Sb. Finally, in a step S8, the road model can be created based on the previously determined information. The road model then comprises a selected path which runs only through vacant grid cells 1a, as well as a profile of road boundaries based on the scanning result. In this way, it is ensured that the selected path is wide enough for the ego vehicle.

However, more or fewer steps can also contribute to the method. The steps can be individually further optimized and/or modified. In addition, the steps can in each case be implemented individually or in combination with other steps—whether mentioned or not. E.g., steps 2 and 3 each provide solutions for subproblems which, depending on the application, offer considerable added value without the remaining steps.

The invention claimed is:

1. A method of planning a trajectory of an ego vehicle, the method comprising:
   capturing a vehicle environment utilizing an environment capturing sensor;
   detecting objects in the vehicle environment;
   producing a grid map with a plurality of grid cells, wherein a resolution of the grid map corresponds to a size of a grid cell among the plurality of grid cells;
   entering detections corresponding to the objects into cells of the grid map, wherein a size of the detections in the cells of the grid map is increased in all dimensions of the grid map by at least half of: a difference between a width of the vehicle and the size of the grid cell;
   determining a path through the grid map which consists only of vacant grid cells; and
   planning the trajectory based on the path.

2. The method according to claim 1, wherein the size of the grid cell is 0.5 m.

3. A method of planning a trajectory of an ego vehicle, the method comprising:
   capturing a vehicle environment utilizing an environment capturing sensor;
   detecting objects in the vehicle environment;
   producing a grid map with a plurality of grid cells, wherein a resolution of the grid map corresponds to a size of a grid cell among the plurality of grid cells;
   entering detections corresponding to the objects into cells of the grid map, wherein a size of the detections in the cells of the grid map is increased in a specific spatial direction of the grid map by at least half of: a difference between a width of the vehicle and the size of the grid cell;

determining a path through the grid map which consists only of vacant grid cells; and planning the trajectory based on the path.

4. A method of planning a trajectory of an ego vehicle, the method comprising:

capturing a vehicle environment utilizing an environment capturing sensor;

detecting objects in the vehicle environment;

producing a grid map with a plurality of grid cells, wherein a resolution of the grid map corresponds to a size of a grid cell among the plurality of grid cells;

entering detections corresponding to the objects into cells of the grid map, wherein a size of the detections in the cells of the grid map is increased in a first dimension and a second dimension of the grid map by at least half of: a difference between a width of the vehicle and the size of the grid cell;

determining a path through the grid map which consists only of vacant grid cells; and planning the trajectory based on the path, wherein the size of the detections in the cells of the grid map in the first dimension is different than the size of the detections in the cells of the grid map in the second dimension.

5. The method according to claim 3, wherein the size of the grid cell is 0.5 m.

6. The method according to claim 4, wherein the size of the grid cell is 0.5 m.

* * * * *